United States Patent
Schockner et al.

[11] Patent Number: 5,955,701
[45] Date of Patent: Sep. 21, 1999

[54] ELECTRICAL WALL OUTLET COVER FOR VISUALLY IMPAIRED PERSONS

[76] Inventors: Phyllis L. Schockner; Ronald M. Schockner, both of 13812 Correnti St., Arleta, Calif. 91331-6104

[21] Appl. No.: 08/931,081

[22] Filed: Sep. 15, 1997

[51] Int. Cl.[6] .................................................... H02G 3/14
[52] U.S. Cl. .............................. 174/66; 220/242; 439/536
[58] Field of Search ..................................... 174/53, 17 R, 174/59, 66, 60, 67, 55, 135; 220/241, 242, 3.8; 439/105, 374, 536, 381; D13/156, 139.1; D8/353

[56] References Cited

U.S. PATENT DOCUMENTS

| | | | |
|---|---|---|---|
| 1,926,001 | 9/1933 | Goodridge | 439/536 |
| 2,895,119 | 7/1959 | Montgomery, Jr. | 439/354 |
| 3,915,476 | 10/1975 | Burkle | 280/422 |
| 4,040,698 | 8/1977 | Ortiz | 439/136 |
| 4,530,556 | 7/1985 | Bonus | 439/296 |

*Primary Examiner*—Dean A. Reichard
*Assistant Examiner*—Dhiru R Patel
*Attorney, Agent, or Firm*—Jack Lo

[57] ABSTRACT

A wall plate for a standard electrical outlet which is raised off the wall by about seven eighths of an inch and having on its front face a pair of recessed areas corrosponding to the upper and lower sockets of a standard wall outlet. The inwardly tapering walls of the recessed areas help guide an elecricl plug adaptor of similar outward shape as the recessed areas into the outlet. In this way a visually impared person or a person with poor muscle control can more easily insert a plug of an electrical appliance into an electrical wall outlet.

2 Claims, 1 Drawing Sheet

ELECTRICAL WALL OUTLET COVER FOR VISUALLY IMPAIRED PERSONS

BACKGROUND OF THE INVENTION

The present invnetion relates to elecrical wall outlet covers and more specificlly to an electrical wall outlet cover for visually impared persons or persons with less than normal motor coordination.

Currently most homes and commercial establishments in this country contain, on at least one interior wall, a means for pluging in electrical appliances and the like into wall outlets via standard two or three prong plugs which are attached to the appliances provided by the manufacturers of said electrical appliances. Currently most wall outlets are attached to studs located in the wall so that the actual outlets are protruding outward from the wall surface by about three sixteenths of an inch. A substantially flat cover plate attaches to the wall outlet by a centrally located screw. The cover plate acts to frame the wall outlet and make a smooth transition between the outlet and surrounding wall. The actual outlets end up being flush with the front surface of the outlet cover. A sighted person with good motor coordination has relativly little problem in inserting an electrical plug into a wall outlet, however a sightless person or a person with poor muscle coordination may find it extreemly difficult to allign the prongs of an electrical plug with the slit type recepticals located in the standard wall outlet. As a sighted person try closing your eyes and plugging in an electrical appliance into an outlet. You will notice how difficult it is.

OBJECTS AND SUMMARY OF THE PRESENT INVENTION

It is an object of the present invention to overcome the above stated problem by providing a unique electrical wall plate cover for an electrical outlet which makes it relativly easy for a visually impaired person or person with poor muscle control to successfully insert an electrical plug into a wall outlet. This outcome is achieved by providing a wall plate cover which fits onto a standard wall outlet but instead of being flat like conventional wall plate covers, the wall plate cover of the present invention extends out from the wall at its perimeter by about seven eighths of an inch and then funnels in to the socket portion creating a guide for the prongs of the plug to easily find their way to the slits of the socket.

DETAILED DESCRIPTION OF THE DRAWINGS

Figure 1:
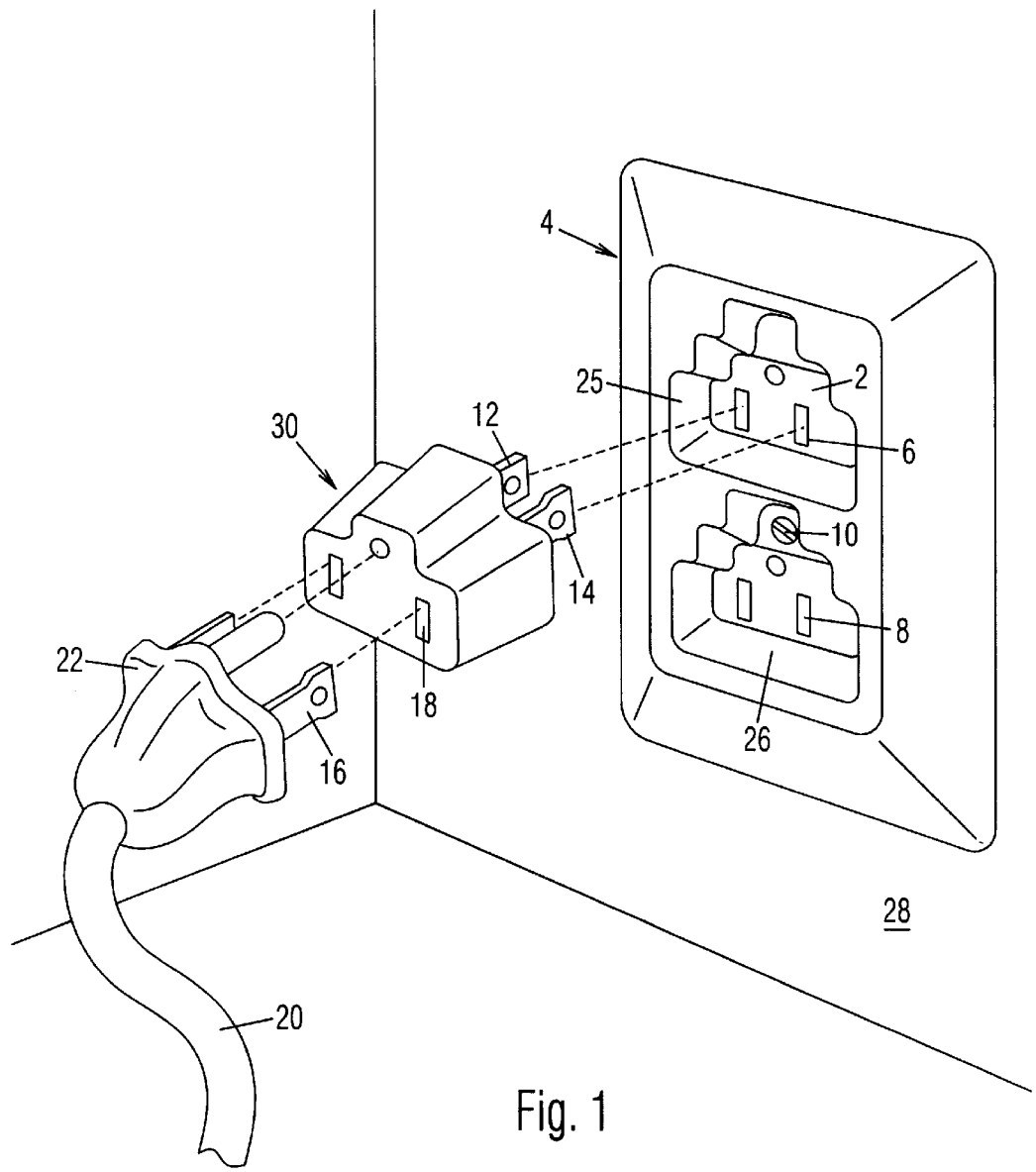
FIG. 1 is an exploded perspective view of the wall socket cover plate of the present invention.

Refferring now to FIG. 1 we see a standard wall socket 2 which is able to accomodate two plugs 22 commonly associated with electrical appliances. The unique wall plate 4 of the present invention is raised off the wall 28 by approximatly seven eighths of an inch rather than being flat as conventional wall plates are. The recessed area created by inner walls 26, 25 are tappered innwardly so as to act as a guide for plug adaptor 30. Because plug adaptor 30 and the perimeter of walls 25, 26 closly match, there is only one way that the plug adaptors can be oriented to have the adaptor be able to penetrate the recessed area shortly after the body of plug adaptor 30 penetrates the recessed area the plug prongs 12, 14 are automatically in the right position to penetrate the recepticles 6, 8 in the wall socket. Prongs 16 on plug 22 penetrate receptacles 18 in plug adaptor 30. The plug 22 on an electrical cord 20 from an electrical appliance may be any size or shape because it is the plug adaptor that interfaces with the wall plate 4. Two adaptors 30 will be provided for each wall plate 4 sold. The wall plate 4 is fastened to the wall socket 2 by a screw 10 in the same fashion as a standard wall plate. In this way a visually impared person or a person with poor muscle coordination can more easily plug an electrical appliance into a wall outlet. Although the embodiment shown is the prefferred embodiment, there may be other embodiments that would be obvious to one versed in the art of wall plates which would be included in the spirit of this patent application.

Therefore we claim:

1. A substantially rectangular electrical wall outlet cover having at its outermost perimeter side walls which extend out from a wall surface by approximately seven eighths of an inch terminating in a flat surface parallel to said wall surface, said flat surface having an upper and a lower cut out portion, said cut out portions each having an inwardly tapering wall which terminates at a face of an electrical wall socket in such a way that a mating adapter plug can be guided by said tapering walls causing a plurality of prongs of said adapter plug to align with and penetrate a plurality of female slots located in said electrical wall socket.

2. An electrical wall outlet cover, comprising:

outermost perimeter side walls for extending out from a wall surface, said outermost perimeter side walls terminating in a flat surface for being parallel to said wall surface, said flat surface having an upper and a lower cut out portion, said cut out portions each having an inwardly tapering wall for terminating at a face of an electrical wall socket, said tapering walls for guiding a mating adapter plug thus causing a plurality of prongs of said adapter plug to align with and penetrate corresponding female slots located in said electrical wall socket.

* * * * *